Patented June 30, 1953

2,643,962

UNITED STATES PATENT OFFICE 2,643,962

TREATMENT OF ELECTRIC APPARATUS INTENDED TO CONTAIN OIL

John Harry Osvald Lindhe, Nynashamn, Sweden, assignor to A. Johnson & Co., Stockholm, Sweden, a body corporate of Sweden No Drawing. Application April 16, 1951, Serial No. 221,337. In Sweden April 17, 1950

4 Claims. (Cl. 148—6.17)

This invention relates to improvements in and relating to the treatment of electric apparatus intended to contain oil as an insulating and cooling medium.

Mineral oils intended for use as insulating and cooling oils in the electrotechnical industry must be refined to such an extent that they only undergo insignificant changes during long periods of use. In cases where it is possible for the oil to come into contact with oxygen, oxidation of the hydrocarbons to asphalt substances and/or acid substances always takes place sooner or later, but it is extremely important that this process of oxidation should take place as slowly as possible.

The constructional materials most commonly employed in the electric industry, namely copper and iron, accelerate the decomposition of the oil owing to their catalytic effect. As soon as any acid-containing products are formed in the oil, these dissolve copper as well as iron. Such oil-soluble salts are very strong oxidation catalysts and considerably accelerate the oxidation which has once started.

Many different methods have been proposed for reducing the decomposition of the oil. Thus, an oxidation inhibitor, usually of the phenol type, is frequently added to the oil. Inhibitors of these types work in such a way that they react with and counteract the formation of peroxides, which is the first step in the oxidation process. After the inhibitor has been consumed, decomposition of the oil occurs very rapidly, however.

Attempts have also been made to coat the metal surfaces with lacquers and varnishes of different types. Generally speaking, however, these attempts have not yielded successful results. In the course of time the lacquers have become partially dissolved in the oil or the oxidation products of the oil, and have rapidly reduced the resistance to oxidation, and consequently the insulating properties of the oil.

The present invention has for its object to provide a method for the treatment of electric apparatus, such as transformers, condensers and cables, which are intended to contain oil as an insulating and cooling medium, whereby the catalytic effect of the metal surfaces present in the apparatus is almost entirely eliminated.

According to the invention this result is obtained by treating the electric apparatus with a mineral oil containing dissolved therein a phosphorus compound which is adapted to react with the metal surfaces of the apparatus with the formation of phosphorus-containing substantially oil-insoluble coatings thereon which have at the most an insignificant catalytic effect, and which serve as a protective coating for these metal surfaces.

By way of example of such phosphorus compounds or inhibitors which are used according to the invention one may mention phosphites and thiophosphates, such as alkyl-phosphoric compounds, for example butyl phosphites and isoamyl phosphites, and barium, calcium and zinc dithio-phosphates.

The quantity of the phosphorus compound added to the oil, calculated as phosphorus in per cent of the weight of the oil, may for example lie within the ranges 0.0001% to 5%, suitably between 0.0002% and 0.5%, and preferably between 0.0004% and 0.4%.

By reaction between these substances and copper or iron, for example, compounds are formed which have a very insignificant catalyzing effect on the oxidation of the oil and an extremely low degree of solubility in the oil.

When carrying out the method of the invention in practice the apparatus may be treated with a suitable mineral oil, for example transformer oil, capacity oil, cable oil or the like, containing a phosphorus compound of the kind indicated, which then reacts with the metal surfaces of the apparatus with the formation of a protective coating as indicated above. The oil may either be filled in the apparatus if this is a container or the like adapted to receive the oil, or otherwise the apparatus or the parts thereof to be treated may be immersed in the oil in a suitable container or vessel. When the treatment with the oil has been completed, the oil is then drawn off whereupon, if found desirable, the apparatus is first rinsed out with oil of the same kind as that to be used subsequently in the apparatus, before the filling of the latter with oil is undertaken.

However, in certain cases the oil may also be retained in the apparatus without disadvantage, especially in case of using organic phosphorus esters as additions to the oil.

The invention will be more clearly understood by reference to the following examples which are purely illustrative and which show the effect of the treatment with different concentrations of a phosphorus-containing inhibitor.

Example 1

Tributyl phosphite was added to a transformer oil in such quantity that the total phosphorus content in the oil amounted to 0.004%, 0.002% and 0.0004% respectively, in three comparative tests. This oil, as well as oil of the same kind to which an inhibitor had not been added, was then subjected to oxidation in oxygen at a temperature of 100° C. for 100 hours in the presence of apparatus containing both copper and iron. As a suitable form of apparatus and method for the test, the so-called Anderson-ASEA-method, described in the Journal Institute of Petroleum, London 1946, pages 412-423, was chosen, since this testing method is particularly well standardized (see "International Electrotechnical Commission Advisory Committee No. 10 on Insulating Oils," April 1935). The sludge formed, together with the acid products, were determined, and the following results were obtained:

|  | Sludge formed percent of the oil | Acid formed mg. KOH/ g. oil |
|---|---|---|
| Without inhibitor | 0.21 | 0.82 |
| With 0.0004 percent phosphorus | 0.09 | 0.42 |
| With 0.002 percent phosphorus | 0.02 | 0.18 |
| With 0.004 percent phosphorus | 0.05 | 0.21 |

Example 2

The catalysts from the preceding example, that is to say, the treated metal parts of the apparatus, were taken up carefully and transferred to oil that had not been treated with an inhibitor and which was then subjected to oxidation in oxygen for 100 hours in the presence of the catalysts prepared in this manner. The following results were obtained:

| Catalyst prepared with oil | Sludge formed percent of the oil | Acid formed mg. KOH/ g. oil |
|---|---|---|
| Without inhibitor | 0.02 | 0.29 |
| With 0.0004 percent phosphorus | 0.01 | 0.08 |
| With 0.002 percent phosphorus | 0.01 | 0.08 |
| With 0.004 percent phosphorus | 0.005 | 0.06 |

The figure for the sludge formed with the catalysts treated in oil without an inhibitor, which is low in comparison with Example 1, is due to the fact that the catalysts were coated with a layer of gum formed by the oxidation during the first test. Even here, however, the figures for sludge and acid are four times higher than is the case when the catalysts are treated with oil containing a quantity of inhibitor corresponding to 0.004% phosphorus.

Example 3

In order to prove that the effect obtained is not due to the formation of a gum layer on the surfaces of the apparatus, the following test was made.

New well cleaned copper and iron catalysts treated in the usual standardized manner with ethyl alcohol and diluted hydrochloric acid, respectively, were immersed in transformer oil containing dissolved therein tributyl phosphite corresponding to a quantity of 0.01% of phosphorus calculated on the weight of the oil. The transformer oil was then maintained at a temperature of 120° C. for 2½ hours.

After that time the catalysts were removed from the oil and a spectroscopic analysis of the metal surfaces thus treated was carried out. Hereby was proved that in both cases a phosphorus-containing coating had been formed on the metal surface.

Example 4

Copper and iron catalysts cleaned and treated with transformer oil containing tributyl phosphite as indicated in Example 3 were then transferred to oil that had not been treated with an inhibitor which was thereupon subjected to oxidation in oxygen at a temperature of 100° C. for 100 hours in the presence of the catalysts prepared in this manner. The following results were obtained:

| Catalyst prepared with oil | Sludge formed percent of the oil | Acid formed mg. KOH/ g. oil |
|---|---|---|
| Without inhibitor | 0.14 | 0.45 |
| With 0.01 percent phosphorus | 0.07 | 0.328 |

Example 5

As examples of the use of metal containing phosphorus compounds the following may be mentioned. Barium hexyl dithiophosphate and zinc hexyl dithiophosphate, respectively, were dissolved in transformer oil and the oil was subjected to an oxidation with oxygen at a temperature of 100° C. for 100 hours in the presence of apparatus containing both copper and iron. The following results were obtained:

(A) With barium hexyl dithiophosphate.

|  | Sludge formed percent of the oil | Acid formed mg. KOH/ g. oil |
|---|---|---|
| Without inhibitor | 0.14 | 0.45 |
| With 0.007 percent phosphorus | 0.41 | 0.98 |
| With 0.0035 percent phosphorus | 0.35 | 0.78 |
| With 0.0007 percent phosphorus | 0.18 | 0.52 |

(B) With zinc hexyl dithiophosphate.

|  | Sludge formed percent of the oil | Acid formed mg. KOH/ g. oil |
|---|---|---|
| Without inhibitor | 0.14 | 0.45 |
| With 0.005 percent phosphorus | 0.42 | 0.98 |
| With 0.0011 percent phosphorus | 0.25 | 0.60 |

As will be seen from these tests, the quantity of sludge increases when the quantity of the added phosphorus compound is increased.

Example 6

New copper and iron catalysts which had been cleaned as stated in Example 3 were treated in transformer oil, containing barium hexyl dithiophosphate (corresponding to 0.007% of phosphorus) and zinc hexyl dithiophosphate (corresponding to 0.011% of phosphorus), respectively, at a temperature of 120° C. for 2½ hours. The catalysts were then transferred to oil that had not been treated with an inhibitor and which was then subjected to oxidation in oxygen at a temperature of 100° C. for 100 hours in the presence of the catalysts prepared in this manner. The following results were obtained:

| Catalysts prepared with oil | Sludge formed percent of the oil | Acid formed mg. KOH/ g. oil |
|---|---|---|
| Without inhibitor | 0.14 | 0.45 |
| With barium hexyl dithiophosphate corresponding to 0.007 percent phosphorus | 0.09 | 0.39 |
| With zinc hexyl dithiophosphate corresponding to 0.011 percent phosphorus | 0.10 | 0.41 |

As will be seen from this example, catalysts treated with barium hexyl dithiophosphate and zinc hexyl dithiophosphate, respectively, have a considerably reduced catalytic effect in comparison with catalysts which have not been subjected to such a treatment.

I claim:

1. A method of rendering copper and iron surfaces of electrical equipment catalytically inactive towards oxidizable hydrocarbon oils, which comprises treating the said metal surfaces with a mineral oil containing dissolved therein a small amount of a metal dithiophosphate, selected from a class consisting of barium, zinc and calcium dithiophosphates, to form a phosphorus-containing coating on the metal surfaces and removing the dithiophosphate-containing oil from contact with the metal.

2. The process of claim 1 wherein the treating oil contains dissolved therein from about 0.0001 to 5% of the dithiophosphate.

3. The process of claim 1 wherein the mineral oil is a transformer oil.

4. A process of preventing sludge formation and oxidation of the oil in transformers, which comprises treating the metal parts of a transformer, which come into contact with the transformer oil, with a mineral oil containing dissolved therein a small amount of a metal dithiophosphate, selected from a class consisting of barium, zinc and calcium dithiophosphates, under conditions causing the formation of a phosphorus-containing compound on the metal parts, removing the dithiophosphate-containing oil and replacing it with transformer oil free from dithiophosphates.

JOHN HARRY OSVALD LINDHE.

References Cited in the file of this patent

UNITED STATES PATENTS

| Number | Name | Date |
| --- | --- | --- |
| 2,058,343 | Moran et al. | Oct. 20, 1936 |
| 2,080,299 | Benning et al. | May 11, 1937 |
| 2,101,632 | Weinrich | Dec. 7, 1937 |
| 2,224,695 | Prutton | Dec. 10, 1940 |
| 2,230,371 | Bolton | Feb. 4, 1941 |
| 2,452,321 | Kluge | Oct. 26, 1948 |
| 2,481,372 | Fuchs et al. | Sept. 6, 1949 |